Figure 1:
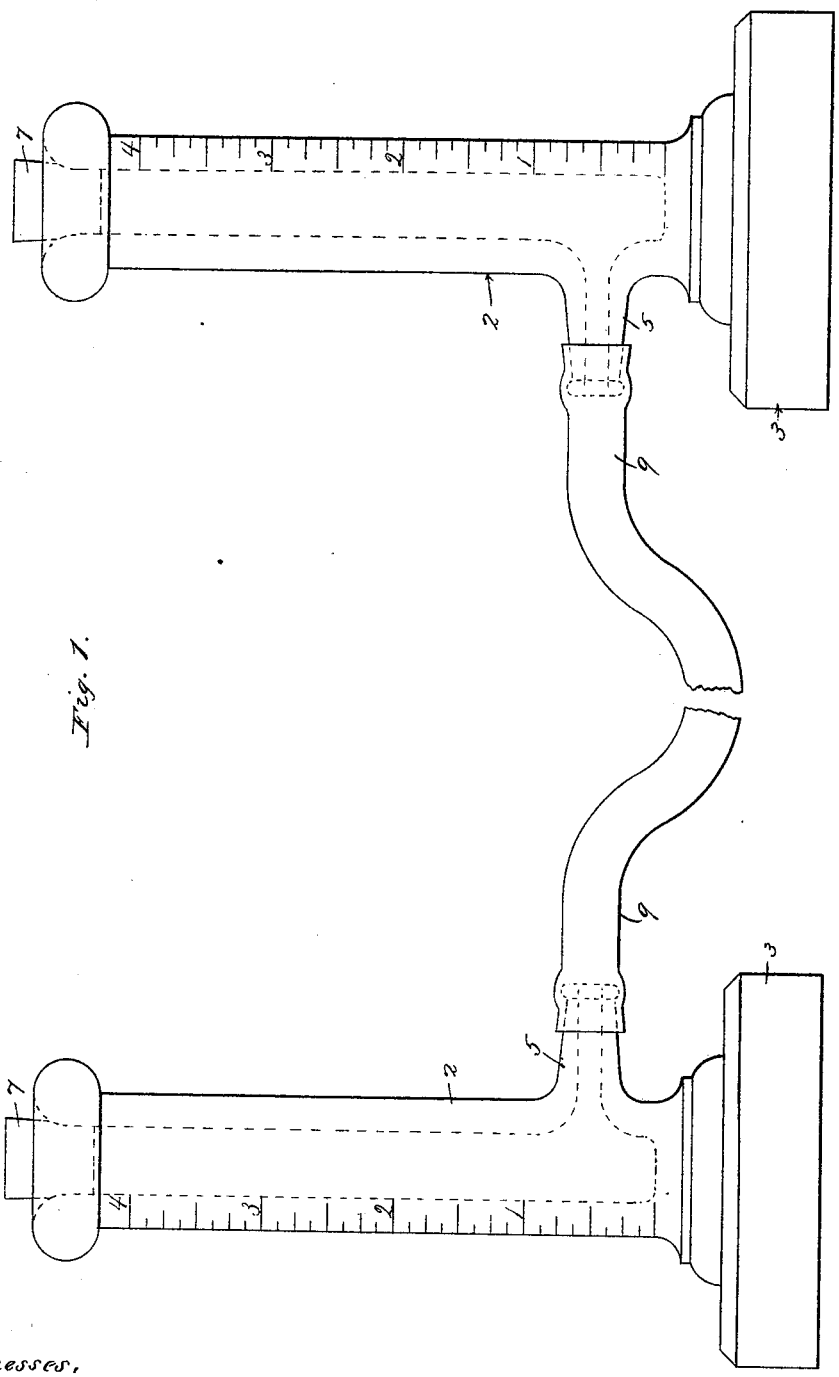

(No Model.)
2 Sheets—Sheet 1.

A. KEGEL.
LEVELING INSTRUMENT.

No. 386,924. Patented July 31, 1888.

Witnesses,
S. J. Beardsley.
R. H. Sanford.

Adam Kegel, Inventor.
By A. C. Paul,
Atty.

(No Model.) 2 Sheets—Sheet 2.
A. KEGEL.
LEVELING INSTRUMENT.
No. 386,924. Patented July 31, 1888.
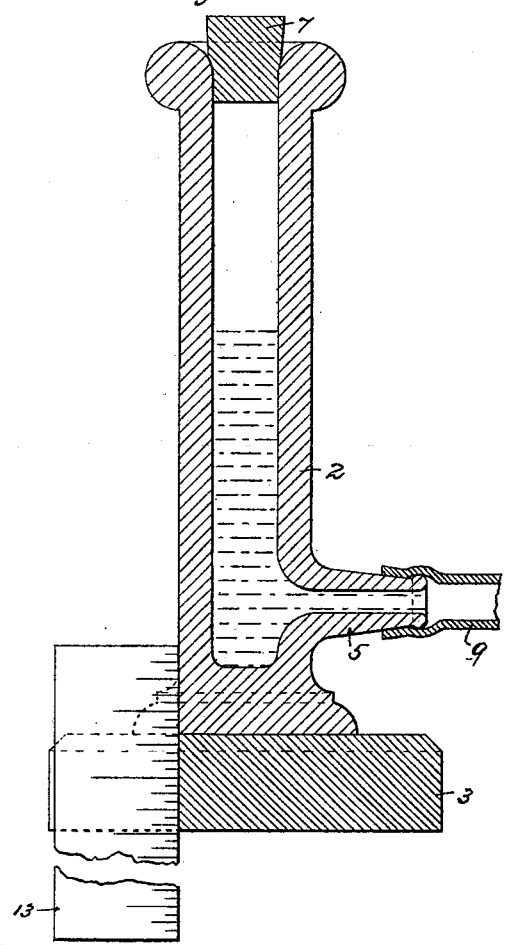
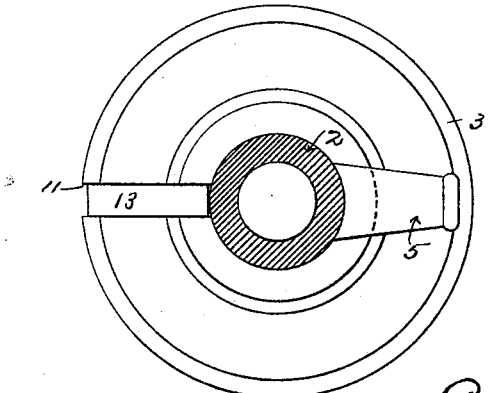
Witnesses.
S. J. Beardelu.
R. H. Sanford.
Inventor
Adam Kegel,
By A. C. Paul.
Atty.

UNITED STATES PATENT OFFICE.

ADAM KEGEL, OF MINNEAPOLIS, MINNESOTA.

LEVELING-INSTRUMENT.

SPECIFICATION forming part of Letters Patent No. 386,924, dated July 31, 1888.

Application filed April 28, 1887. Serial No. 236,510. (No model.)

*To all whom it may concern:*

Be it known that I, ADAM KEGEL, of Minneapolis, in the county of Hennepin and State of Minnesota, have invented certain new and useful Improvements in Leveling-Instruments, of which the following is a specification.

This invention relates to improvements in devices designed for determining when surfaces are upon the same level or for ascertaining the difference in level between them.

The invention consists, generally, in the construction and combination hereinafter described, and pointed out in the claim.

In the accompanying drawings, Figure 1 is an elevation of my improved device. Fig. 2 is a vertical section of one of the cups, showing the manner of applying a rule thereto. Fig. 3 is a plan section of one of the cups.

In the drawings, 2 2 represent suitable cups preferably formed of glass and of substantially the shape shown. The cups are formed with suitable bases, 3, and with the projecting pipes 5. Upon each cup is marked a suitable scale, as shown in Fig. 1. I have shown cups whose main portions are about four inches high and are divided into inches and fractions thereof. The inch-divisions are marked 1 to 4, beginning at the bottom. Each cup is also provided with a suitable stopper, 7. A flexible rubber or other suitable tube, 9, has its ends connected with the cups by being passed over the ends of the projections 5. This tube may be of any suitable length.

It will be seen that this device forms a simple instrument by means of which the difference in level between surfaces that are considerably distant from each other may be determined.

The device is especially adapted for use in putting up buildings, especially those made of brick or stone. One of the cups may be placed on top of a course of brick or stone and the other carried to a remote part of the building. Water is poured into one of the cups, and is allowed to run through the flexible tube into the other cup; or, as a more expeditious way, the mouth may be applied to the open end of the other cup and the water sucked through the tube. The second cup is then placed on the other part of the building, or on the surface with which the measurement is to be made, and the difference in height of the water in the two glasses will be the difference between the two surfaces upon which the glasses rest. Of course if the water stands at the same height in each glass the two surfaces are on the same level.

In order that the difference in level between two surfaces may be conveniently measured where that difference is more than the height of one of the glasses, I provide a notch or recess, 11, in the base of each glass of sufficient depth and width to permit the edge of an ordinary measuring-rule, 13, to be inserted into the base to substantially the outer line of the main part of the cup. The lower end of the rule may then be placed on the wall of the building or other surface the relative position of which is to be determined and the cup held by the hand and slipped along the rule until the water in the cup is on a level with the water in the other cup. The bottoms of the cups will then be on the same level and the distance measured on the rule from the bottom of the cup to the lower end of the rule will be the difference in level between the surface upon which the rule rests and the surface upon which the other cup is placed.

A variety of ways in which the device may be used will suggest themselves to any practical man. The bases project, preferably, beyond the ends of the nozzles 5, so as to protect the same. When the device is not in use, the flexible tube may be removed and rolled up and the whole put away in a small space.

This instrument will also be found convenient for use in leveling billiard-tables and for similar purposes. In this case the glass cups can be made quite small and connected by a short tube.

This instrument is adapted to be used equally as well with a scale-rod, 13, or without it within the limits of the scale upon the cup 2.

I claim as my invention—

The leveling-instrument herein described, comprising, in combination, the two cups each provided with a scale, and a flat base, 3, having a notch or opening, 11, formed therein, and a flexible tube connecting the lower portions of said cups.

In testimony whereof I have hereunto set my hand this 14th day of April, 1887.

ADAM KEGEL.

In presence of—
A. C. PAUL,
A. M. GASKELL.